(12) United States Patent
Koski

(10) Patent No.: US 7,243,016 B2
(45) Date of Patent: Jul. 10, 2007

(54) SINGLE WIRE DUAL SPEED SIGNAL SYSTEM

(75) Inventor: Jack P. Koski, South Lyon, MI (US)

(73) Assignee: General Motors Corporation, Detroit, MI (US)

( * ) Notice: Subject to any disclaimer, the term of this patent is extended or adjusted under 35 U.S.C. 154(b) by 623 days.

(21) Appl. No.: 10/836,658

(22) Filed: Apr. 30, 2004

(65) Prior Publication Data

US 2005/0246083 A1 Nov. 3, 2005

(51) Int. Cl.
*G06F 19/00* (2006.01)
(52) U.S. Cl. ............... 701/61; 701/51; 701/58; 701/60; 477/15; 477/34; 477/110
(58) Field of Classification Search ............ 701/1, 701/51, 58, 60, 61; 477/15, 34, 110
See application file for complete search history.

(56) References Cited

U.S. PATENT DOCUMENTS

| | | | | |
|---|---|---|---|---|
| 4,875,391 A | * | 10/1989 | Leising et al. ............ | 477/155 |
| 5,855,533 A | * | 1/1999 | Tolkacz et al. ............ | 477/110 |
| 6,165,102 A | * | 12/2000 | Bellinger .................. | 477/54 |
| 6,264,580 B1 | * | 7/2001 | Tabata et al. ............. | 477/149 |
| 7,079,932 B2 | * | 7/2006 | Keyse et al. .............. | 701/51 |
| 2002/0082759 A1 | * | 6/2002 | Katakura et al. .......... | 701/54 |
| 2002/0095248 A1 | * | 7/2002 | Katakura et al. .......... | 701/29 |
| 2003/0158645 A1 | * | 8/2003 | Czarnecki et al. ......... | 701/51 |

* cited by examiner

*Primary Examiner*—Thomas Black
*Assistant Examiner*—Wae Lenny Louie
(74) *Attorney, Agent, or Firm*—Christopher DeVries

(57) ABSTRACT

A control system and method for communicating with a transmission includes a transmission input speed sensor that generates an input speed signal. A transmission output speed sensor generates an output speed signal. A power supply supplies a total current to the transmission input and output speed sensors via a first conductor. A sensor senses the total current supplied to the transmission input and output speed sensors on the first conductor. A calculating module calculates a transmission input speed and a transmission output speed based on the total current.

16 Claims, 11 Drawing Sheets

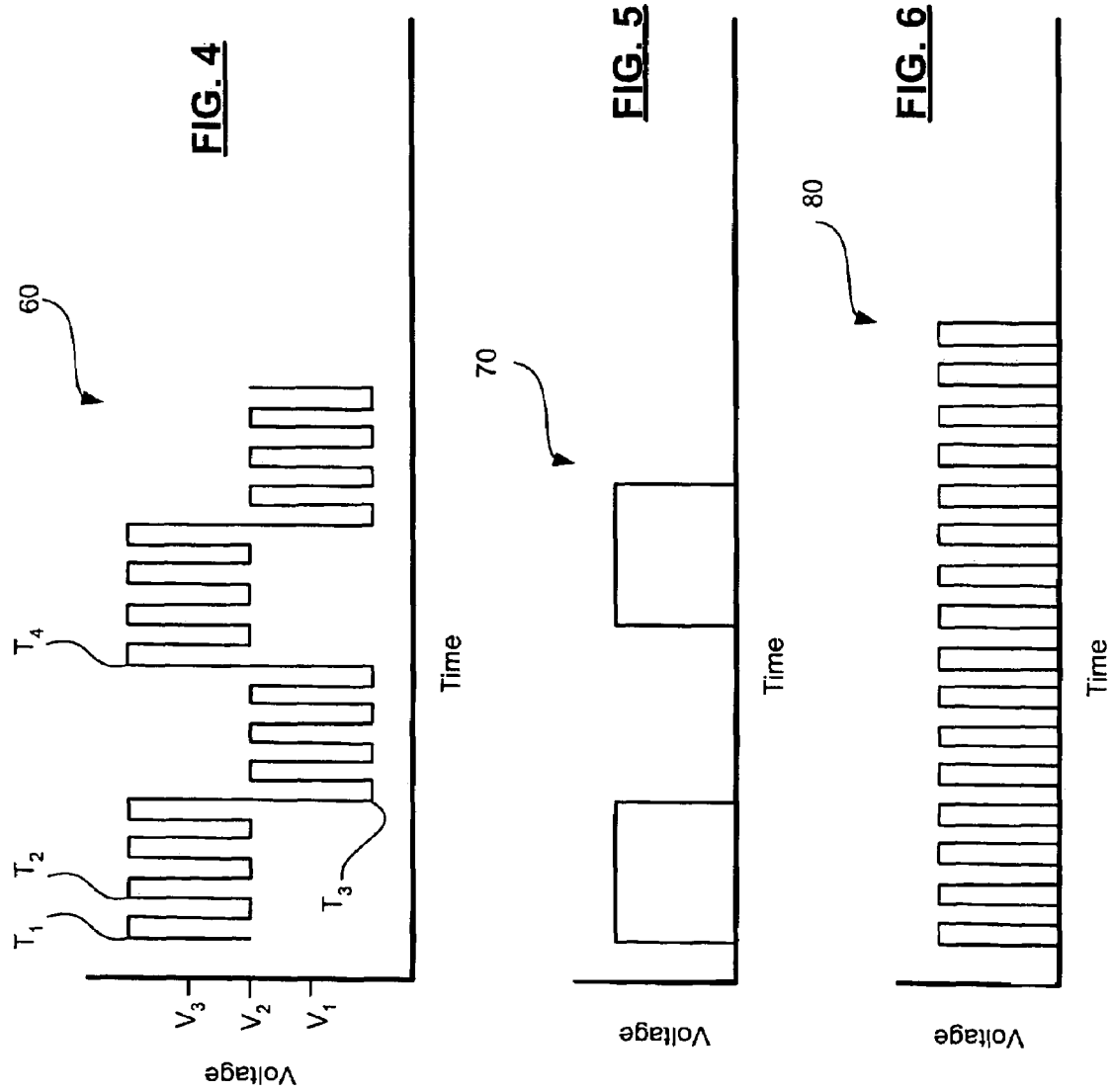

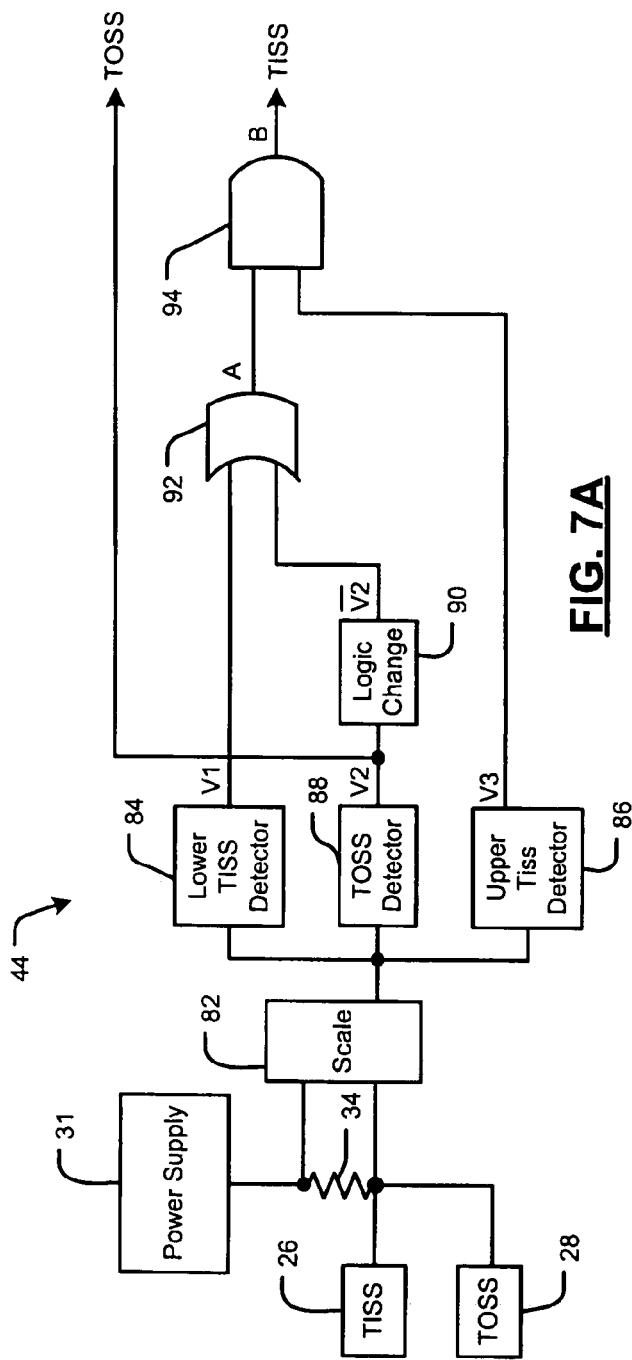

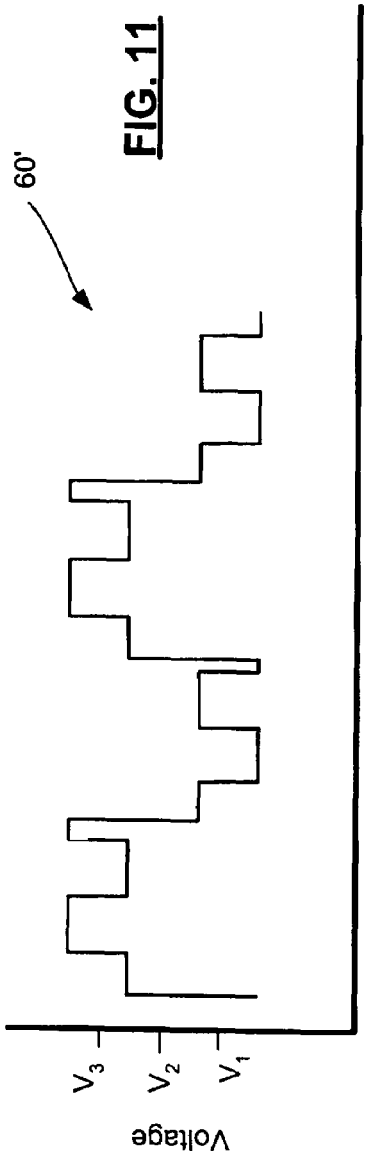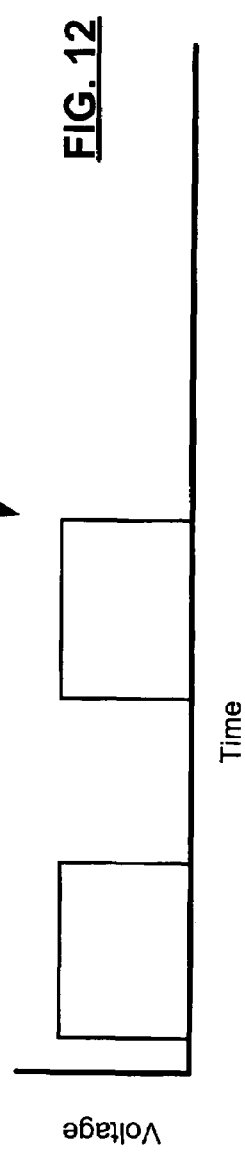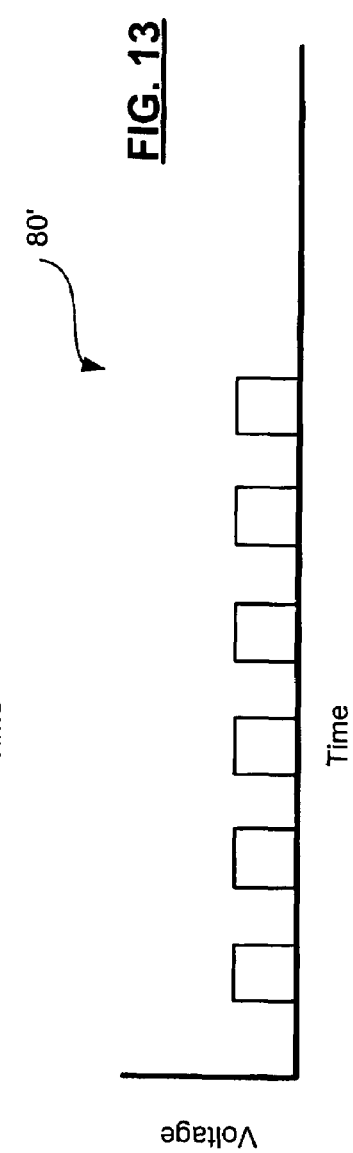

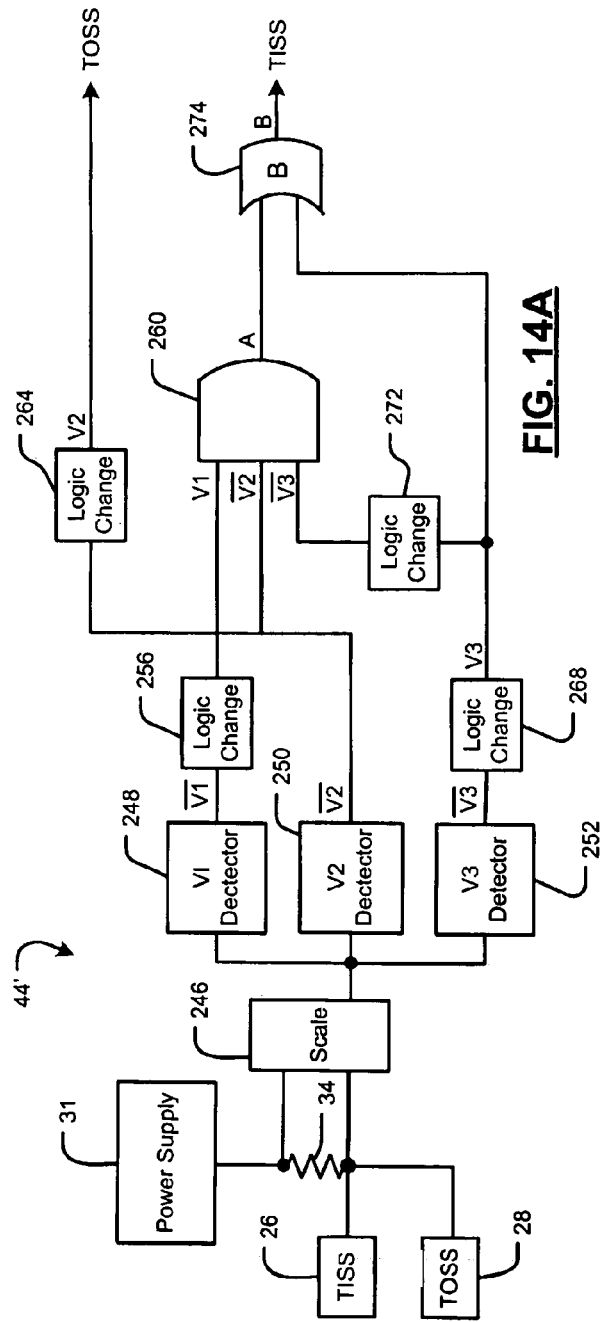

SINGLE WIRE DUAL SPEED SIGNAL SYSTEM

FIELD OF THE INVENTION

The present invention relates to transmission speed sensors, and more particularly to input and output speed sensors for a transmission.

BACKGROUND OF THE INVENTION

Vehicle transmissions convert rotation of an engine into rotation of a drive shaft. Transmissions provide different selectable gear ratios that vary the relationship between the input and output speeds. The input and output speeds are typically determined using input and output speed sensors.

An exemplary control system is shown in FIG. 1. A controller 4 and a transmission 5 are shown. The controller 4, such as a powertrain control module, delivers power from a power supply 6 to a transmission input speed sensor 7 (TISS) and a transmission output speed sensor 8 (TOSS), respectively, through a first wire $W_1$. A TISS signal is output to a first sensing resistor $R_1$ in the controller 4 through a second wire $W_2$. A first voltage sensor $VS_1$ generates a voltage signal to a calculating module 9. A TOSS signal is output to a second sensing resistor $R_2$ in the controller 4 through a third wire $W_3$. A second voltage sensor $VS_2$ generates a voltage signal to the calculating module 9. This approach requires separate wires for power ($W_1$), for the TOSS signal ($W_2$) and for the TISS signal ($W_3$). The use of separate wires adds cost, installation time and increased potential for warranty claims.

SUMMARY OF THE INVENTION

A control system and method for communicating with a transmission includes a transmission input speed sensor that generates an input speed signal. A transmission output speed sensor generates an output speed signal. A power supply supplies a total current to the transmission input and output speed sensors via a first conductor. A sensor senses the total current supplied to the transmission input and output speed sensors on the first conductor. A calculating module calculates a transmission input speed and a transmission output speed based on the total current.

According to other features, the transmission input speed sensor senses rotation of an input gear in the transmission, the input gear having a tooth pattern defining a plurality of input gear peaks and valleys. The transmission input gear generates a first signal for detecting the peaks and generates a second signal, distinct from the first signal, for detecting the valleys. The transmission output speed sensor senses rotation of an output gear in the transmission, the output gear having a tooth pattern defining a plurality of output gear peaks and valleys. The transmission output speed sensor generates a third signal for detecting the output gear peaks and generates a fourth signal, distinct from the third signal, for detecting the output gear valleys.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 4 is a plot of a signal communicated through the single wire control system of FIG. 3;

FIG. 5 is a control generated plot of a first transmission speed sensor based on the plot of FIG. 4;

FIG. 6 is a control generated plot of a second transmission speed sensor based on the plot of FIG. 4;

FIG. 7A is an exemplary calculating module according to the present invention;

FIG. 7B is a logic table according to the calculating module of FIG. 7A;

FIG. 11 is a plot of a signal communicated through the single wire control system of FIG. 3A according to other features of the present invention;

FIG. 12 is a control generated plot of a first transmission speed sensor based on the plot of FIG. 11;

FIG. 13 is a control generated plot of a second transmission speed sensor based on the plot of FIG. 11;

FIG. 14A is an exemplary calculating module according to the present invention;

FIG. 14B is a logic table according to the calculating module of FIG. 14A; and

DETAILED DESCRIPTION OF THE PREFERRED EMBODIMENTS

The following description of the preferred embodiment is merely exemplary in nature and is in no way intended to limit the invention, its application, or uses.

Figure 2:
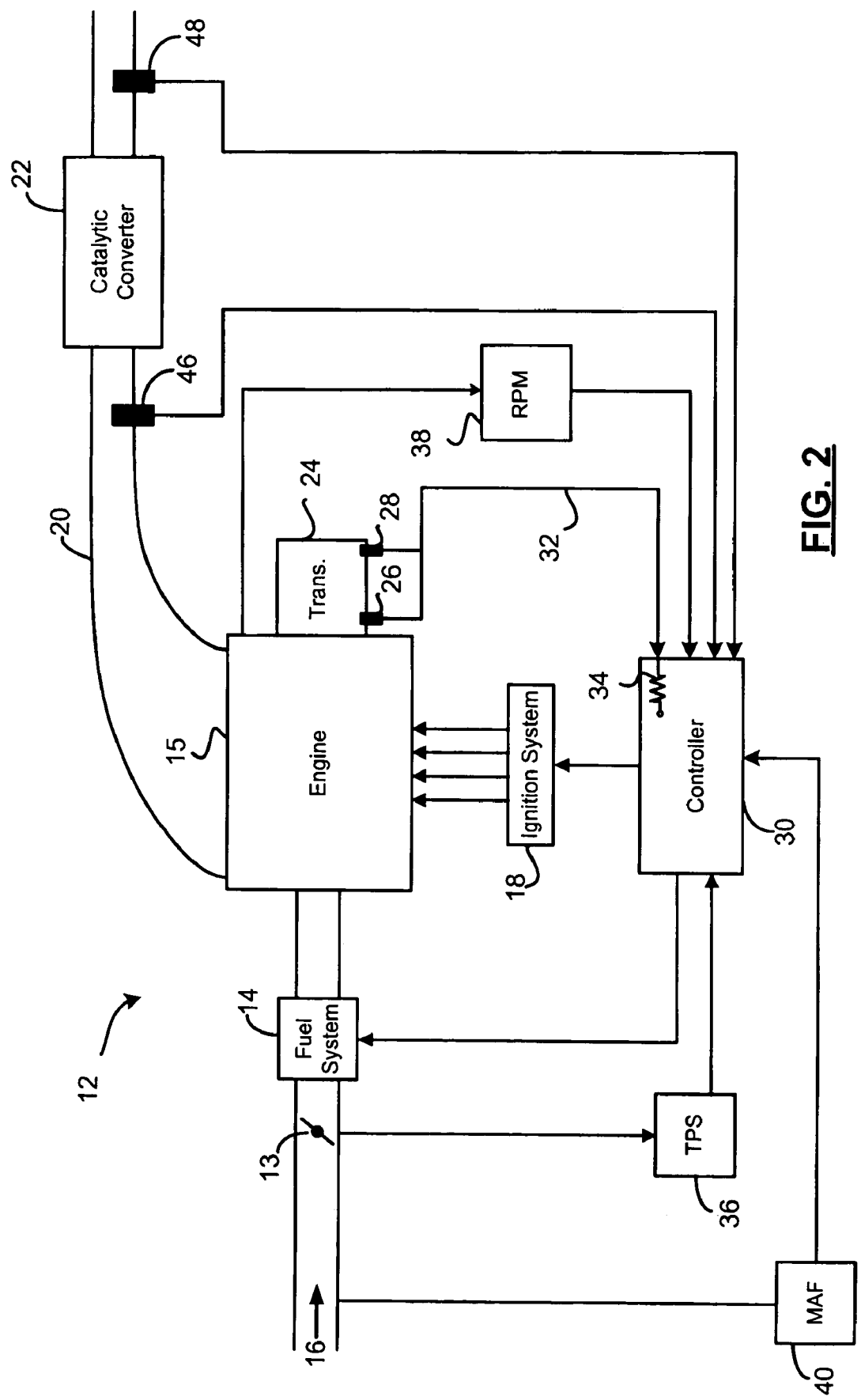
FIG. 2 is a functional block diagram of a control system according to the present invention.

Referring to FIG. 2, an exemplary engine control system 12 is shown. A throttle 13 and a fuel system 14 control the air/fuel mixture that is delivered to an engine 15 through an intake 16. An ignition system 18 ignites the air/fuel mixture in the engine 15. Exhaust gas that is created by the ignition of the air/fuel mixture is expelled through an exhaust manifold 20. A catalytic converter 22 receives the exhaust gas from the exhaust manifold 20 and reduces the emissions levels of the exhaust gas. A transmission 24 is drivingly engaged between the engine 15 and a driveshaft (not shown). The transmission 24 may comprise an automatic transmission or a manual transmission and includes an input speed sensor 26 and an output speed sensor 28. As will be described in greater detail, the input speed sensor 26 and the output speed sensor 28 are powered through and transmit signals between a controller 30 through a single conductor or wire 32. The wire 32 communicates with a sensing resistor 34 disposed in the controller 30.

The controller 30 also communicates with various other components of the engine control system 12, including but not limited to a throttle position sensor 36 (TPS), the fuel system 14, the ignition system 18, and an engine speed sensor 38 (RPM). The controller 30 receives a throttle position signal from the TPS 34 and a mass air flow signal from a mass air flow sensor (MAF) 40. The throttle position signal and the mass air flow signal are used to determine air flow into the engine 15. The air flow data is then used to calculate fuel delivery from the fuel system 12 to the engine 15. The controller 30 further communicates with the ignition system 18 to determine ignition spark timing. Oxygen sensors 46 and 48 are disposed in the exhaust 20 upstream and downstream respectively of the catalytic converter 22.

The controller 30 may receive additional feedback from other components in the engine control system 12. These and other variables may affect the overall performance and behavior of the engine control system 12. The controller 30 utilizes data gathered from the various engine components to monitor and optimize engine performance.

Figure 1:
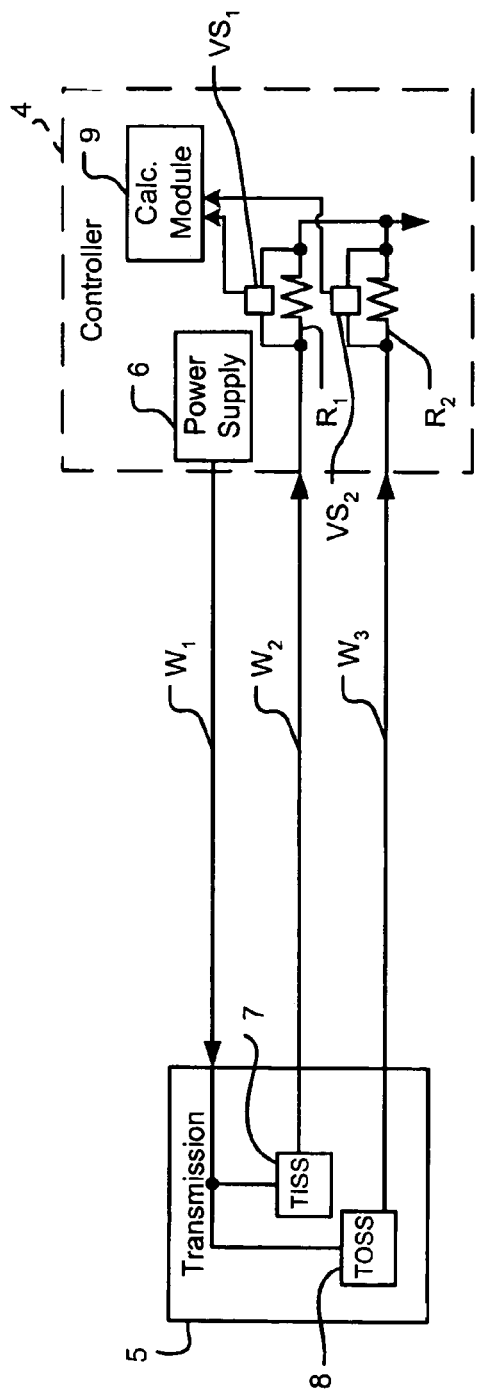
FIG. 1 is a functional block diagram illustrating a control system for measuring transmission input and output speed according to prior art.
Figure 3A:
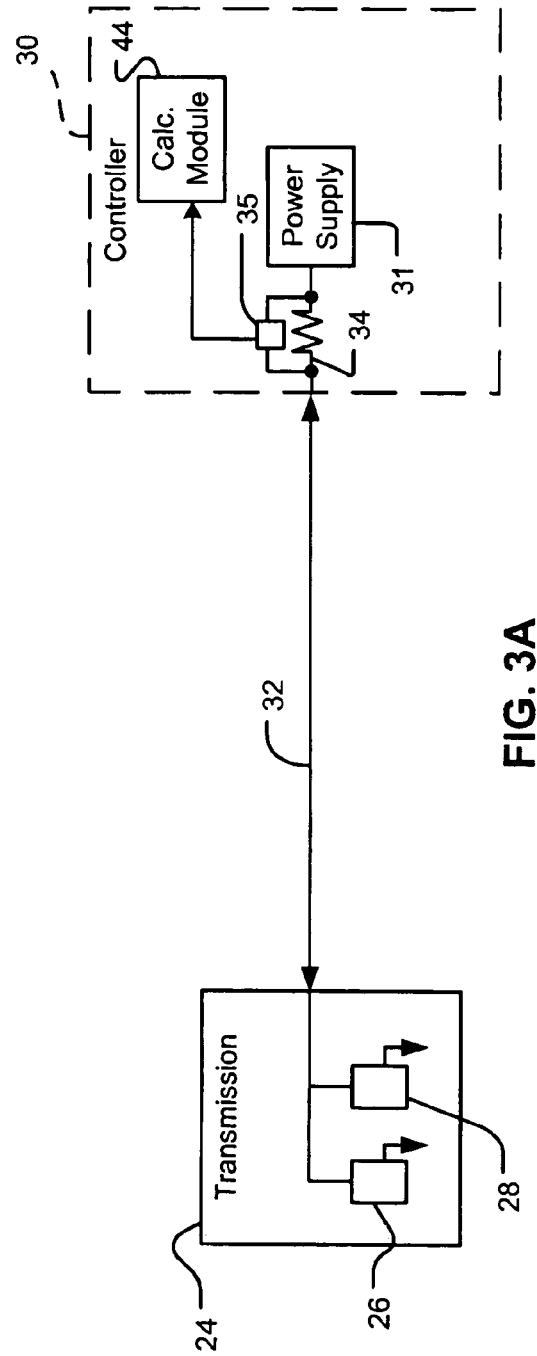
FIG. 3A is a functional block diagram illustrating the transmission and controller of the control system of FIG. 2.
Figure 3B:
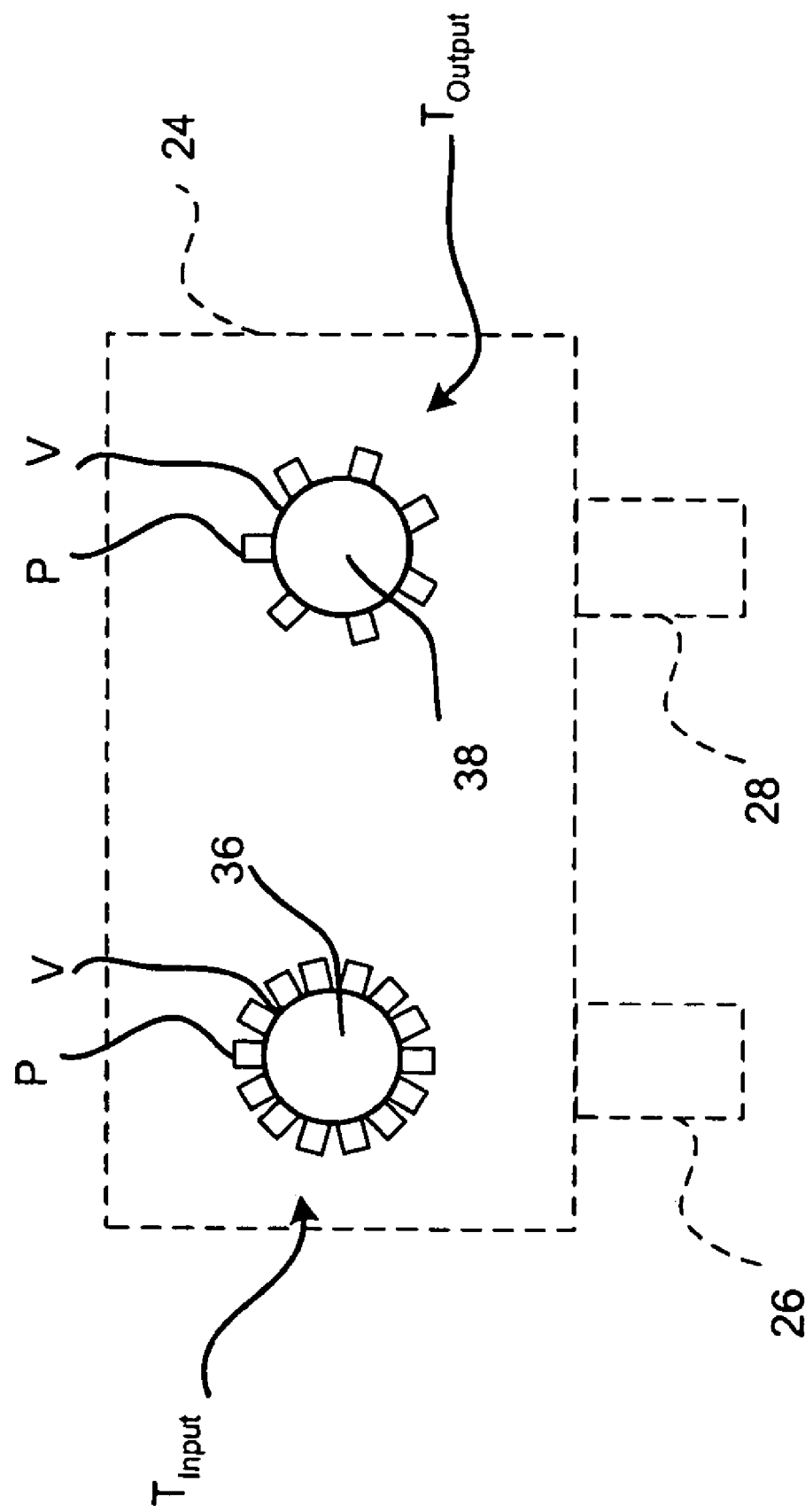
FIG. 3B is a block diagram illustrating the transmission input and output gears.

With specific reference to FIGS. 3A and 3B, the control system will be described in greater detail. As shown, the wire 32 electrically connects the transmission input and output speed sensors 26 and 28, respectively, to the controller 30. The input and output speed sensors 26 and 28 receive power from a power supply 31. In one implementation, the input and output speed sensors 26 and 28 are configured to detect teeth ($T_{Input}$ and $T_{output}$) disposed around a respective transmission input gear 36 and transmission output gear 38 (FIG. 3B). Specifically, the input and output speed sensors 26 and 28 are constant current devices and each flow a first current corresponding to detection of a tooth or peak, P. In addition, the input and output speed sensors 26 and 28 flow a second current corresponding to detection of an area between adjacent teeth or valley, V. A voltage sensor 35 determines a total current received by the input and output speed sensors 26 and 28 based on a voltage drop across the sensing resistor 34. The voltage sensor 35 sends a signal representing the total current to a calculating module 44. The calculating module 44 determines a transmission input and output speed from the input and output speed sensors 26 and 28. The input and output speed sensors 26 and 28 are Hall Effect sensors. A suitable Hall Effect sensor includes a Model ATS643 manufactured by Allegro MicroSystems Inc. Skilled artisans will readily appreciate that other sensors may be incorporated.

With continued reference to FIGS. 3A and 3B and further reference to FIG. 4, the signal communicated between the transmission input and output speed sensors 26 and 28 and the controller 30 will be described. FIG. 4 illustrates an exemplary voltage signal determined by the voltage sensor 35 across the sensing resistor 34. The transmission input speed sensor (TISS) signal and the transmission output speed sensor (TOSS) signal are communicated concurrently through the wire 32 and are represented as a summed trace 60. The summed trace 60 represents voltage based on the currents from the TISS 26 and the TOSS 28 and the resistance of the sensing resistor 34. The summed trace 60 represents a TISS 26 and a TOSS 28 generating an equivalent signal for detection of a peak and an equivalent signal for detection of a valley. For example, the TISS 26 and the TOSS 28 each draw a current of 14 milliamps through the wire 32 when detecting a peak and draw a current of 6 milliamps when detecting a valley. Skilled artisans will recognize that these currents are merely exemplary.

Turning now to FIGS. 5 and 6, the decoding of the trace in FIG. 4 will be described. As used herein, the term module and/or device refers to an application specific integrated circuit (ASIC), an electronic circuit, a processor (shared, dedicated, or group) and memory that execute one or more software or firmware programs, a combinational logic circuit, or other suitable components that provide the described functionality.

The exemplary scenario described with respect to the signal in FIG. 4 illustrates a trace 60 representing four distinct signals, or more specifically, a first and second signal from the input sensor 26 and a third and fourth signal from the output sensor 28. When the input and output sensors 26 and 28 are configured to communicate equivalent signals for detecting a peak and equivalent signals for detecting a valley, a design constraint must be implemented with respect to the input and output gears. In this regard, the frequency of teeth disposed around the input gear is greater than 1.35 times the frequency of teeth disposed around the output gear for an overdrive ratio of 0.742. Such a constraint ensures that the frequency of one signal is always greater than the frequency of the second signal allowing control to later decode the single trace and differentiate signals from each of the TISS and TOSS. Skilled artisans will readily appreciate that the ratio of input and output teeth is exemplary. In this way, other ratios may be implemented so long as one frequency is always greater than the other frequency regardless of gear.

Alternatively, it is appreciated that a TISS and TOSS may be included that provide 4 distinct signals having unique currents thus eliminating this design constraint. For example, a TISS may be configured to receive a current of 14 and 6 milliamps for a peak and valley, respectively, and a TOSS may be configured to receive a current of 7 and 3 milliamps for a peak and valley respectively. As a result, the controller may easily differentiate the signal provided from the TISS 26 and the signal provided from the TOSS 28.

With reference to FIG. 4, the trace 60 is plotted as a voltage with respect to time. It is understood that a voltage may be obtained from the current drawn by the TISS 26 and the TOSS 28 and through the resistance provided by the sensing resistor 34 as is known in the art. Control sets two timers to zero at a first time ($T_1$) at a first rising edge. When control interprets a second rising edge at a second time ($T_2$), a calculation can be made to determine a time difference between $T_1$ and $T_2$. Based on the number of teeth disposed around the first gear (the input gear in this example) a calculation is made to determine the transmission input speed. As shown, the trace 60 oscillates and transitions through a first, a second and a third reference voltage, $V_1$, $V_2$ and $V_3$. Control determines that the oscillation between $T_1$ and $T_2$ ranges between $V_2$ and $V_3$. Because $V_3$ may only be attained from a peak, peak signal from the TISS and the TOSS, control can determine that the higher frequency gear (input gear) has oscillated from $T_1$ to $T_2$.

At time $T_3$, control determines from the low voltage $V_1$ that a valley, valley signal from the TISS and the TOSS has been communicated. Consequently, at $T_4$ control determines that a peak to peak time calculation may be made for the TOSS signal from $T_1$ to $T_4$. From the time calculation and the known teeth disposed around the output gear, control calculates the transmission output speed. As illustrated in FIGS. 5 and 6, from the time calculations and the known constraints of the signals provided by the TISS and TOSS, control translates the summed trace 60 into a TOSS trace 70 (FIG. 5) and a TISS trace 80 (FIG. 6).

Referring now to FIGS. 7A and 7B, the calculating module 44 is illustrated in further detail. An input of a scale module 82 receives the signal from the voltage sensor 34. The scale module 82 optionally scales the signal and outputs a scaled voltage signal to a lower TISS detector 84, an upper TISS detector 86 and a TOSS detector 88, respectively. The scale module 82 ensures that voltage levels of signals that are output to the voltage detectors 82, 84 and 86 are within voltage detection tolerances of the voltage detectors. For example, the scale module 82 may amplify the signal from the voltage sensor 34.

Since the waveform of the scaled voltage signal comprises four different voltage levels, the lower TISS detector 84, the upper TISS detector 86 and the TOSS detector 88 detect when the amplitude of the scaled voltage signal is greater than first, second and third predetermined voltages $V_1$, $V_2$ and $V_3$, respectively. For example, the lower TISS detector 84 determines when the amplitude of the scaled voltage signal is greater than the first predetermined voltage $V_1$. The lower TISS detector 84 outputs a digital "low" (or digital "0") signal when the amplitude of the scaled voltage signal is greater than the first predetermined voltage $V_1$. Similarly, the TOSS detector 88 and the upper TISS detector 86 output digital "low" signals when the amplitude of the scaled voltage signal is greater than the second and third predetermined voltages $V_2$ and $V_3$, respectively.

Based on the outputs of the lower TISS detector 84, the upper TISS detector 86 and the TOSS detector 88, the calculating module 44 determines waveforms that represent the TOSS trace and the TISS trace. An input of a logic change module 90 receives an output of the TOSS detector 88. For example, the logic change module 90 may be an inverter such as a logic NOT gate. In the event that the output of the TOSS detector 88 is a digital "low" signal, an output of the logic change module 90 is a digital "high" (or digital "1") signal. A first input of a logic OR gate 92 receives the output from the logic change module 90. A second input of the logic OR gate 92 receives an output of the lower TISS detector 84. A first input of a logic AND gate 94 receives an output from the logic OR gate 92. A second input of the logic AND gate 94 receives an input from the upper TISS detector 86. The output of the logic AND gate 94 is a waveform that represents the TISS trace 80 (FIG. 6) and an output of the TOSS detector 88 is a waveform that represents the TOSS trace 70 (FIG. 5).

Referring now to FIG. 7B, a logic table describes the state of signals within the calculating module based on the outputs of the voltage detectors 84, 86 and 88. A V1 column includes a "0" when an amplitude of the scaled voltage signal is greater than the first predetermined voltage and a "1" when the amplitude of the scaled voltage signal is less than the first predetermined voltage. Similarly, V2 and V3 columns include "0's" and "1's" when the amplitude of the scaled voltage signal is greater than and less than the second and third predetermined voltages, respectively. An inverted V2 column includes an opposite value of the V2 column.

An "A" column includes a "1" when the output of the logic OR gate 92 is a digital "high" signal and a "0" when the output of the logic OR gate 92 is a digital "low" signal. Similarly, a "B" column includes a "1" when the output of the logic AND gate 94 is a digital "high" signal and a "0" when the output of the logic AND gate 94 is a digital "low" signal. Therefore, the V2 column represents a position of the waveform representing the TOSS trace 70, and the "B" column represents a position of the waveform representing the TISS trace 80. It is appreciated that the calculating module and logic table illustrated in FIGS. 7A and 7B are exemplary.

Figure 8:
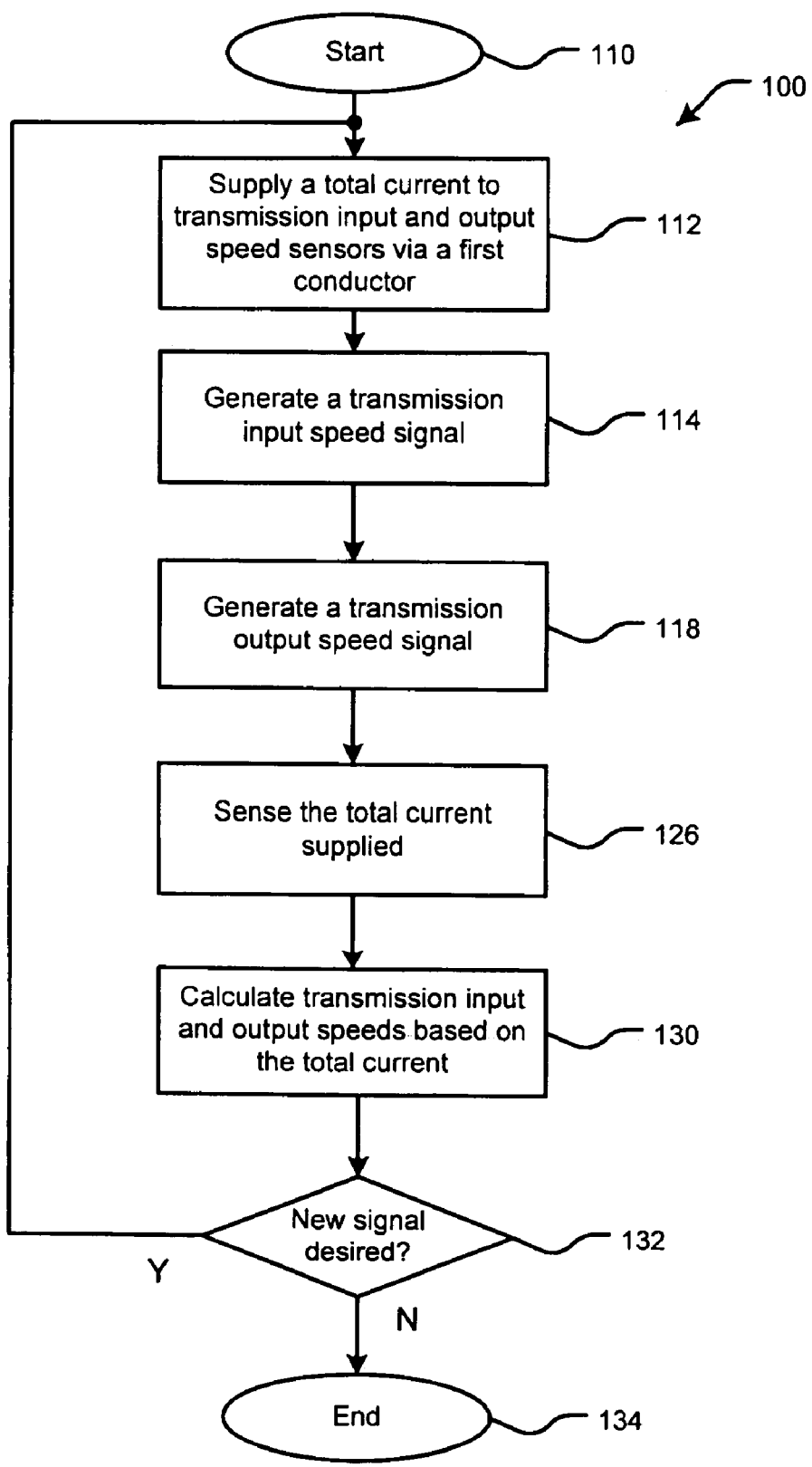
FIG. 8 is a flow diagram illustrating steps for determining a transmission input speed and a transmission output speed according to the present invention.

Turning now to FIG. 8, steps for determining a transmission input speed and a transmission output speed are shown generally at 100. Control begins in step 110. In step 112, a total current is supplied by a power source to the transmission input and output speed sensors 26 and 28 via a first conductor. In step 114, a transmission input speed signal is generated by the TISS 26. In step 118, a transmission output speed signal is generated by the TOSS 28. In step 126, the total current supplied to the TISS 26 and TOSS 28 is determined. In step 130, transmission input speed and the transmission output speed are calculated based on the total current. Step 130 is explained in further detail and is represented by the flow diagrams 150 and 180 shown in FIGS. 9 and 10. Control determines whether a new signal is desired in step 132. If a new signal is desired, control loops to step 112. If a new signal is not desired, control ends in step 134.

Figure 9:
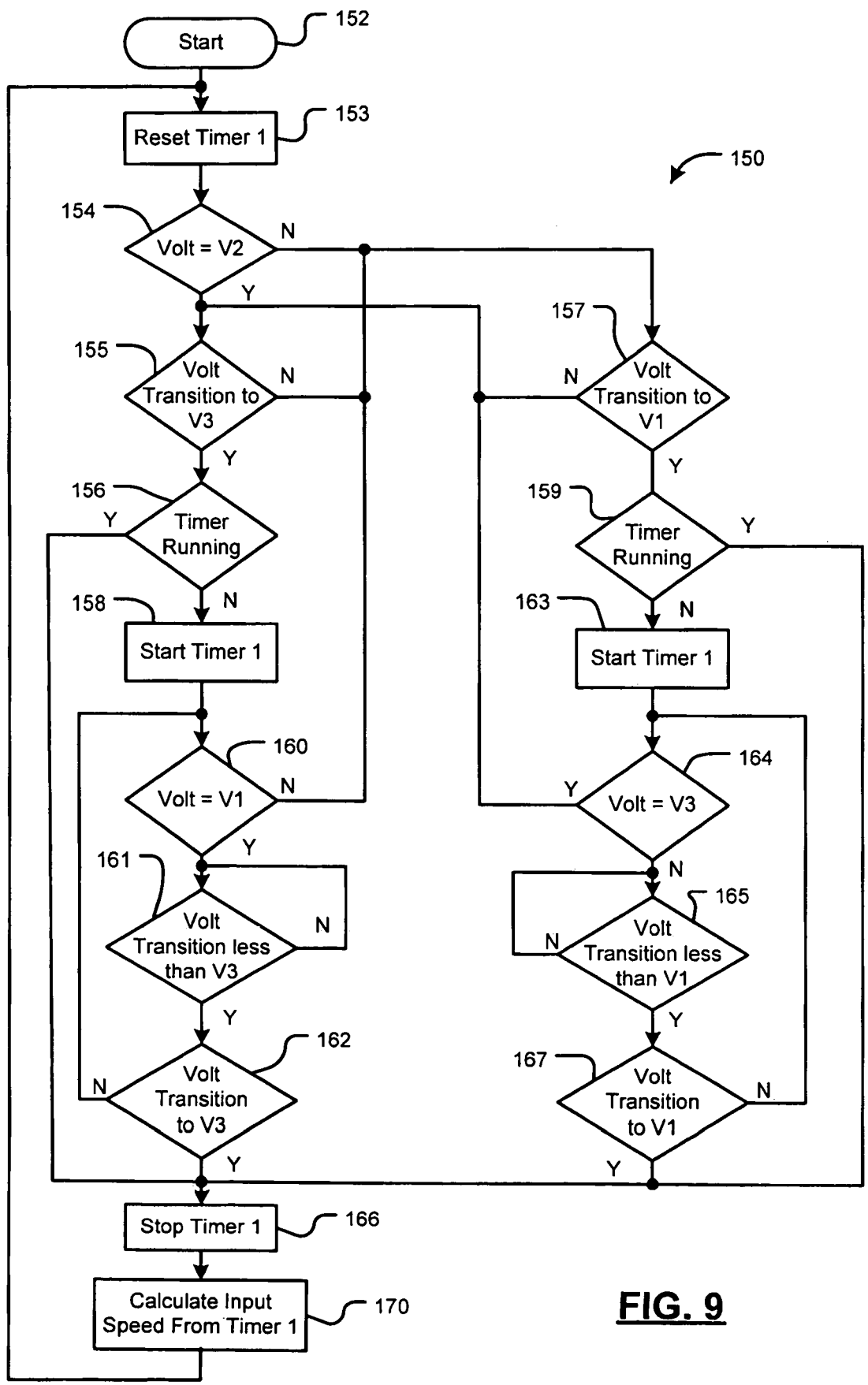
FIG. 9 is a flow diagram illustrating steps for determining a transmission input speed.

With reference to FIG. 9, steps for determining a transmission input speed are shown generally at 150. Control begins in step 152. In step 153, Timer 1 is reset. In step 154, control determines whether the voltage of the trace 60 (FIG. 4) is equal to $V_2$. If the voltage is not equal to $V_2$, control loops to step 157 where control extracts TISS speed from the lower half of the waveform $t_3$ to $t_4$. If the voltage is equal to $V_2$, control loops to step 155 where control extracts TISS speed from the upper half of the waveform $t_1$ to $t_3$. In step 155, control determines whether the voltage of the trace 60 (FIG. 4) has transitioned to V3. If it has, control loop steps to 156. In step 156, control determines if Timer 1 is already running. If not, control steps to 158 where Timer 1 is started at Time=$T_1$. In step 160, control determines whether the voltage of the trace 60 is equal to $V_1$. If not, control loops to step 157. If the voltage equals $V_1$, control determines if the voltage of the trace 60 has transitioned to less than $V_3$ in step 161. If not, control loops back to step 161. If the voltage has transitioned to less than $V_3$, control determines if the voltage has transitioned back to V3 in step 162. If not, control loops back to step 160. If it has, control stops Timer 1 in step 166. In step 170, control calculates the transmission input speed from Timer 1 and control loops to step 153. If the voltage in step 154 is not equal to $V_2$, control loops to step 157 where control extracts TISS speed from the lower half of the waveform $t_3$ to $t_4$. Control determines if voltage has transitioned to $V_1$. If not, control loops to step 155. If it has, control determines if Timer 1 is already running in step 159. If Timer 1 is already running, control loops to step 166. If not, Timer 1 is started in step 163. Control steps to 164 where it determines voltage is equal to V3. If it has, control loops to step 155. If not, control steps to 165 where it determines if the voltage has transitioned to V1. If it has not, control loops back to step 165. If it has, control determines if the voltage has transitioned to $V_1$ in step 167. If it has not, control loops back to step 164. If it has, control loops to step 166 where the Timer 1 is stopped and control calculates the transmission input speed. Control loops back to step 153.

Figure 10:
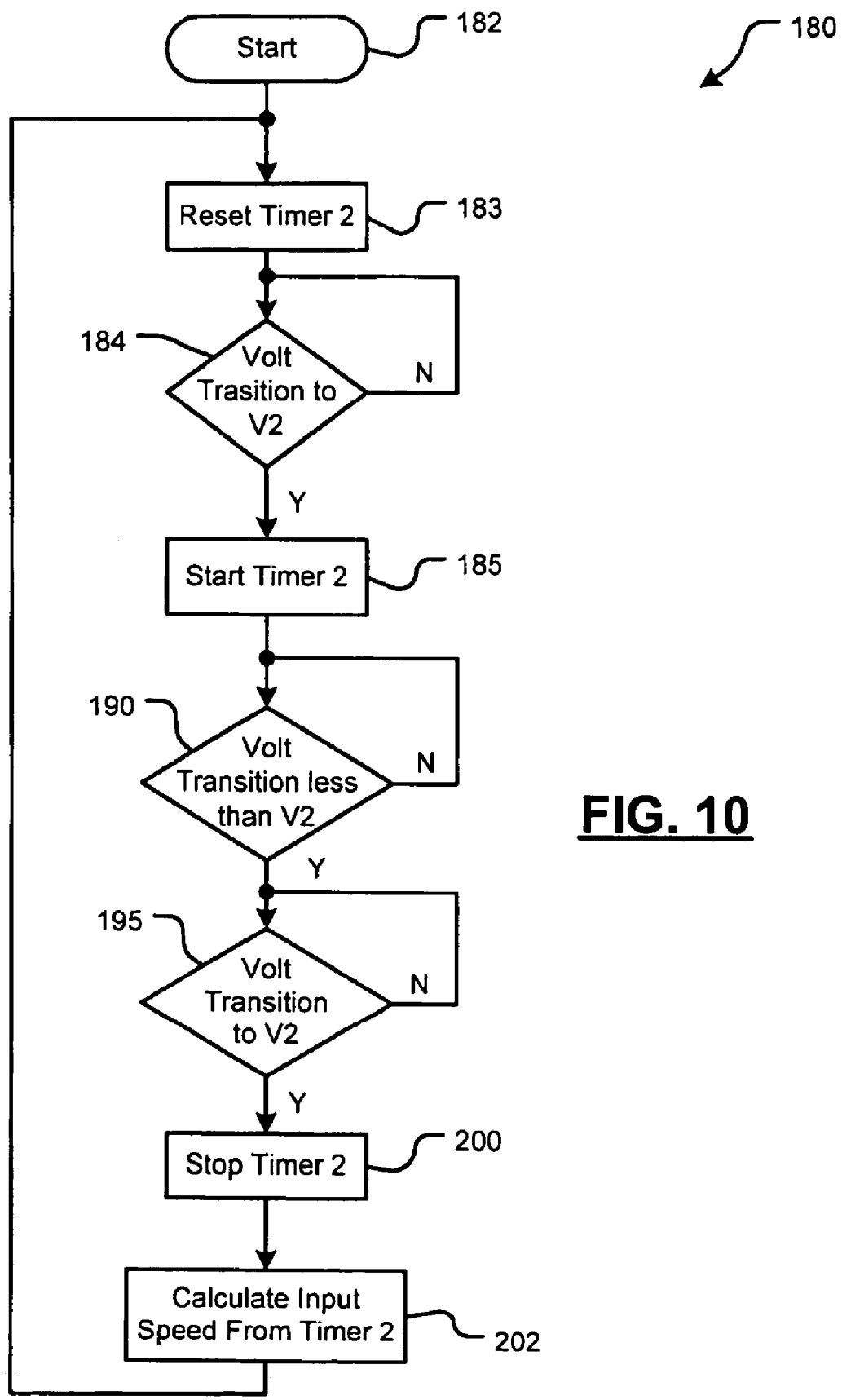
FIG. 10 is a flow diagram illustrating steps for determining a transmission output speed.

With reference to FIG. 10, steps for determining a transmission output speed are shown generally at 180. Control begins in step 182. In step 183, Timer 2 is reset. In step 184, control determines if the voltage has transitioned to $V_2$. If it has not, control loops back to step 184. If it has, Timer 2 is started in step 185. In step 190, control determines if the voltage has transitioned to less than $V_2$. If it has not, control loops back to step 190. If it has, control determines if the voltage has transitioned to $V_2$ in step 195. If it has not, control loops back to step 195. If it has, Timer 2 is stopped in step 200. Control steps to 202 where the transmission output speed is calculated from Timer 2 and control loops to step 183.

With reference now to FIGS. 11–13, a signal communicated between the transmission input and output speed sensors 26 and 28 and the controller 30 according to other features will be described. In FIGS. 11–13, the TISS and the TOSS sensor 26 and 28 may be configured to receive a signal having different frequency and different amplitude. The calculating module differentiates the signal provided from the TISS and the signal provided from the TOSS. The calculating module differentiates the signal provided from the TISS and the signal provided from the TOSS. The calculating module interprets the summed trace 60' and translates the summed trace 60' into a TOSS trace 70' (FIG. 12) and a TISS trace 80' (FIG. 13).

Referring now to FIG. 14A, the calculating module 44' is illustrated in further detail. An input of a scale module 246 receives the signal from the voltage sensor 34. The scale module 246 optionally scales the signal and outputs a scaled voltage signal to first, second, and third voltage detectors 248, 250 and 252, respectively. The scale module 246 ensures that voltage levels of signals that are output to the voltage detectors are within voltage detection tolerances of the voltage detectors. For example, the scale module 246 may amplify the signal from the voltage sensor.

Since the waveform of the scaled voltage signal comprises four different voltage levels, the first, second, and third voltage detectors 248, 250 and 252 detect when the amplitude of the scaled voltage signal is greater than first, second, and third predetermined voltages $V_1$, $V_2$ and $V_3$, respectively. For example, the first voltage detector 248 determines when the amplitude of the scaled voltage signal is greater than the first predetermined voltage $V_1$. The first voltage detector 248 outputs a digital "low" (or digital "0") signal when the amplitude of the scaled voltage signal is greater than the first predetermined voltage. Similarly, the second and third voltage detectors $V_2$ and $V_3$ output digital "low" signals when the amplitude of the scaled voltage signal is greater than the second and third predetermined voltages, respectively.

Based on the outputs of the first, second, and third voltage detectors 248, 250 and 252, the calculating module 44' determines waveforms that represent the TOSS trace and the TISS trace. An input of a first logic change module 256 receives an output of the first voltage detector 248. For example, the logic change module 256 may be an inverter such as a logic NOT gate. In the event that the output of the first voltage detector 248 is a digital "low" signal, an output of the first logic change module 256 is a digital "high" (or digital "1") signal. A first input of a logic AND gate 260 receives the output from the first logic change module 256.

An input of a second logic change module 264 and a second input of the logic AND gate 260 receive an output of the second voltage detector 250. An input of a third logic change module 268 receives an output of the third voltage detector 252. An input of a fourth logic change module 272 and a first input of a logic OR gate 274 receive an output of the third logic change module 268. A third input of the logic AND gate 260 receives an output of the fourth logic change module 272. The logic AND gate 260 outputs a digital "high" signal only when the first, second, and third inputs of the logic AND gate 260 receive a digital "high" signal. Otherwise, the output of the logic AND gate is a digital "low" signal.

A second input of the logic OR gate 274 receives the output of the logic AND gate 260. The logic OR gate 274 outputs a digital "high" signal when either the first input or the second input of the logic OR gate 274 receive a digital "high" signal. The output of the logic OR gate 274 is a waveform that represents the TISS trace 80' (FIG. 13), and an output of the second logic change module is a waveform that represents the TOSS trace 70' (FIG. 12).

Referring now to FIG. 14B, a logic table describes the state of signals within the calculating module based on the outputs of the first, second, and third voltage detectors. A V1 column includes a "0" when an amplitude of the scaled voltage signal is greater than the first predetermined voltage and a "1" when the amplitude of the scaled voltage signal is less than the first predetermined voltage. Similarly, V2 and V3 columns include "0's" and "1's" when the amplitude of the scaled voltage signal is greater than and less than the second and third predetermined voltages, respectively. An inverted V2 column includes an opposite value of the V2 column. Similarly, an inverted V3 column includes an opposite value of the V3 column. Since the second and third voltage detectors are active low devices, the inverted V2 and V3 columns represent actual values of signals that are output from the second and third voltage detectors, respectively.

An "A" column includes a "1" when the output of the logic AND gate 260 is a digital "high" signal and a "0" when the output of the logic AND gate 260 is a digital "low" signal. Similarly, a "B" column includes a "1" when the output of the logic OR gate 274 is a digital "high" signal and a "0" when the output of the logic OR gate 274 is a digital "low" signal. Therefore, the V2 column represents a position of the waveform representing the TOSS trace, and the "B" column represents a position of the waveform representing the TISS trace.

When the amplitude of the scaled voltage signal is less than the first, second, and third predetermined voltages, both the TISS and the TOSS detect a valley. When the amplitude of the scaled voltage signal is greater than the first predetermined voltage and less than the second and third predetermined voltages, the TISS detects a peak and the TOSS detects a valley. When the amplitude of the scaled voltage signal is greater than the first and second predetermined voltages and less than the third predetermined voltage, the TISS detects a valley and the TOSS detects a peak. When the amplitude of the scaled voltage signal is greater than the first, second, and third predetermined voltages, both the TISS and TOSS detect a peak.

Figure 15:
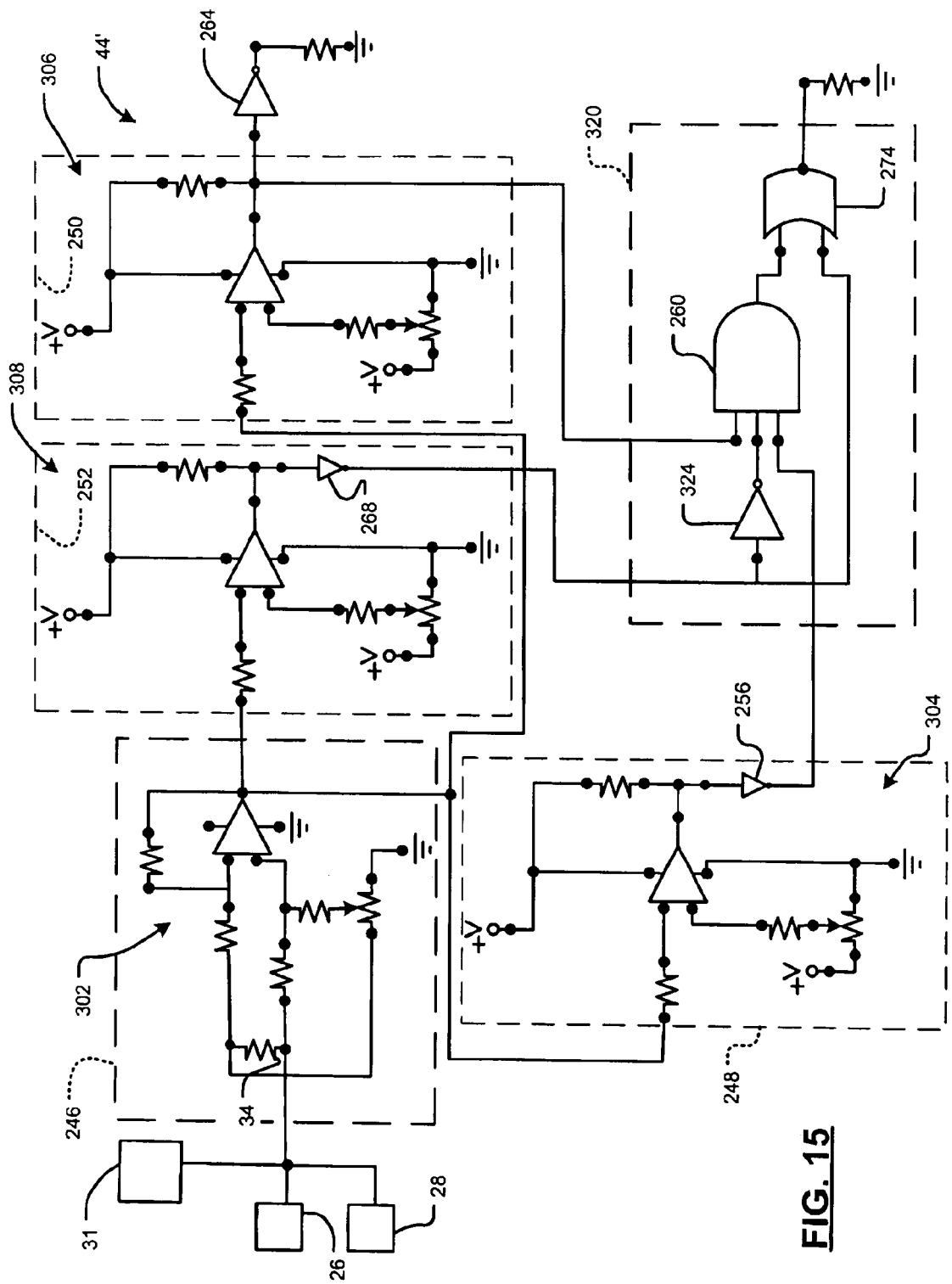
FIG. 15 is an exemplary electrical schematic of the calculating module of FIG. 14A.

Referring now to FIG. 15, an exemplary electrical schematic of the calculating module 44' is shown. The scale module 246 includes an amplifier circuit 302 with an operational amplifier (op-amp). The amplifier circuit 302 optionally amplifies the signal from the voltage sensor 34 to generate the scaled voltage signal. Inputs of the first, second, and third voltage detectors 248, 250 and 252 receive the scaled voltage signal from the output of the scale module 246. The first voltage detector 248 includes a first comparator circuit 304 with a first comparator. The first comparator circuit 304 compares a first reference voltage to the amplitude of the scaled voltage signal. The first comparator circuit 304 outputs a digital "low" signal when the amplitude of the scaled voltage signal is greater than the first reference voltage. For example, the first reference voltage may be set to a voltage just above which the TISS and the TOSS detect a valley.

Similarly, the second and third voltage detectors 250 and 252 include second and third comparator circuits 306 and 308 with second and third comparators. For example, the first, second, and third comparator circuits 304, 306 and 308 may be inverting comparator circuits. The second and third comparator circuits 306 and 308 determine when the amplitude of the scaled voltage signal is greater than second and third reference voltages, respectively. For example, the third reference voltage may be set to a voltage above which the TISS and the TOSS detect a peak. The second reference voltage may be set to a voltage that is between the first and third reference voltages and that determines when one of the TISS and the TOSS detect a peak and the other detects a valley.

First, second, and third logic change modules 256, 264 and 268 receive signals from the first, second, and third voltage detectors 248, 250 and 252, respectively. The first, second, and third logic change modules include first, second, and third logic NOT gates that invert signals. An output signal of the second logic change module 264 is a waveform that represents the TOSS trace. A decoder circuit 320 receives output signals of the first and third logic change modules 256 and 268 and an output signal of the second voltage detector 250. The decoder circuit 320 includes the fourth logic change module 324, the logic AND gate 260, and the logic OR gate 274. An output signal of the decoder is the output of the logic OR gate and is a waveform that represents the TISS trace. It is appreciated that the calculating module, logic table and schematic illustrated in FIGS. 14A–15 are exemplary.

Those skilled in the art can now appreciate from the foregoing description that the broad teachings of the present invention can be implemented in a variety of forms. For example, while the discussion with respect to FIGS. 4–6 is directed toward interpreting a voltage from the currents received by the TISS and TOSS and the resistance provided from the sensing resistor 34, the same conclusions may be obtained by interpreting different signals provided from the TISS and the TOSS. Therefore, while this invention has been described in connection with particular examples thereof, the true scope of the invention should not be so limited since other modifications will become apparent to the skilled practitioner upon a study of the drawings, the specification and the following claims.

What is claimed is:

1. A control system for communicating with a transmission comprising: a transmission input speed sensor that generates an input speed signal;
a transmission output speed sensor that generates an output speed signal;
a power supply that supplies a total current to said transmission input and output speed sensors via a first conductor;
a sensor that senses said total current supplied to said transmission input and output speed sensors on said first conductor; and
a calculating module that calculates a transmission input speed and a transmission output speed based on said total current.

2. The control system of claim 1 wherein said transmission input speed sensor senses rotation of an input gear in said transmission, said input gear having a tooth pattern defining a plurality of input gear peaks and valleys.

3. The control system of claim 2 wherein said transmission input speed sensor generates a first signal for detecting said peaks and generates a second signal, distinct from said first signal, for detecting said valleys.

4. The control system of claim 3 wherein said transmission output speed sensor senses rotation of an output gear in said transmission, said output gear having a tooth pattern defining a plurality of output gear peaks and valleys.

5. The control system of claim 4 wherein said transmission output speed sensor generates a third signal for detecting said output gear peaks and generates a fourth signal, distinct from said third signal, for detecting said output gear valleys.

6. The control system of claim 5 wherein said first and third signals are equivalent and said second and fourth signals are equivalent.

7. The control system of claim 1 wherein said input and output speed sensors comprise hall effect sensors.

8. The control system of claim 1 wherein said controller supplies power to said transmission input and output speed sensors through said first conductor.

9. A method of determining a transmission input speed and a transmission output speed comprising:
providing a total current to a transmission input speed sensor and a transmission output speed sensor through a first conductor;
sensing said total current supplied to said transmission input speed sensor and said transmission output speed sensor on said first conductor; and
calculating a transmission input speed and a transmission output speed based on said total current.

10. The method of claim 9 wherein calculating a transmission input speed signal comprises:
detecting a tooth pattern defining a plurality of input gear peaks and valleys;
generating a first signal for detecting said input gear peaks; and
generating a second signal, distinct from said first signal, for detecting said input gear valleys.

11. The method of claim 10 wherein sensing said total current supplied comprises determining an input gear current used by a hall effect sensor sensing a transmission input gear.

12. The method of claim 11 wherein sensing said total current supplied comprises determining an output gear current used by a hall effect sensor with a transmission output gear.

13. The method of claim 9 wherein calculating a transmission output speed signal comprises:
detecting a tooth pattern defining a plurality of output gear peaks and valleys;
generating a third signal for detecting said output gear peaks; and
generating a fourth signal, distinct from said third signal, for detecting said output gear valleys.

14. A method of determining a transmission input speed and a transmission output speed comprising:
providing a total current to a transmission input speed sensor and a transmission output speed sensor through a first conductor;
generating a transmission input speed signal from said transmission input speed sensor;
generating a transmission output speed signal from said transmission output speed sensor;
sensing said transmission input and output speed signal on said first conductor; and
calculating a transmission input speed and a transmission output speed based on said transmission input and output speed signal.

15. The method of claim 14 wherein generating a transmission input speed signal comprises:
detecting a tooth pattern defining a plurality of input gear peaks and valleys;
generating a first signal for detecting said input gear peaks; and generating a second signal, distinct from said first signal, for detecting said input gear valleys.

16. The method of claim 14 wherein generating a transmission output speed signal comprises:
   detecting a tooth pattern defining a plurality of output gear peaks and valleys;
   generating a third signal for detecting said output gear peaks; and
   generating a fourth signal, distinct from said third signal, for detecting said output gear valleys.

* * * * *